United States Patent [19]

Donahue

[11] 4,259,650
[45] Mar. 31, 1981

[54] SIDELOBE REJECTION FILTER

[75] Inventor: Thomas H. Donahue, Glendale, Calif.

[73] Assignee: International Telephone and Telegraph Corporation, New York, N.Y.

[21] Appl. No.: 21,963

[22] Filed: Mar. 19, 1979

[51] Int. Cl.³ .......................... H03H 7/30; H03H 7/01
[52] U.S. Cl. .................................. 333/166; 333/138; 333/167
[58] Field of Search ................. 333/167, 138, 166, 20, 333/28 R; 328/165, 55, 58, 109–112, 162, 167; 364/819–822, 824

[56] References Cited

U.S. PATENT DOCUMENTS

| 2,957,042 | 10/1960 | Gibson et al. | 333/28 R X |
| 3,315,171 | 4/1967 | Becker | 333/28 R X |
| 3,651,433 | 3/1972 | Langley | 333/166 |
| 3,737,808 | 6/1973 | Srivastava | 333/28 R X |

Primary Examiner—Marvin L. Nussbaum
Attorney, Agent, or Firm—William T. O'Neil

[57] ABSTRACT

Disclosed is a Sidelobe Rejection Filter for reducing the time sidelobes seen in the auto-correlation output signals from a matched filter. Such matched filters are used with radars utilizing pulse compression techniques, for example. The sidelobe rejection filter may be utilized whenever the time response of the auto-correlation signals includes a plurality of sidelobes each having a period $\tau$ and having essentially the same amplitude. Accordingly, the disclosed sidelobe rejection filter is particularly useful for pulse compression radars employing linear FM (i.e., Chirp) or Barker phase coded waveforms.

The matched filter includes a delay circuit coupled to receive the time response of the auto-correlation signal, which delay circuit inserts a delay of $\tau$, and a subtraction circuit for finding the difference between the delayed and undelayed time FM pulse compression techniques, the output of the subtraction circuit need merely be rectified to obtain an output signal whose sidelobes are substantially reduced in amplitude. In the case of phase coded pulse compression techniques using Barker codes, on the other hand, the output of the subtraction circuit is supplied to both positive and negative rectification circuits, one of whose outputs is then delayed by $N\tau$, where N is the number of bits in the Barker code. The output of the $N\tau$ delay circuit is well as the output of the other rectification circuit is then applied to an adder for further reducing time sidelobes. The output of the adder is applied to yet another rectification circuit for providing an auto-correlation response which is substantially free of time sidelobes.

11 Claims, 7 Drawing Figures

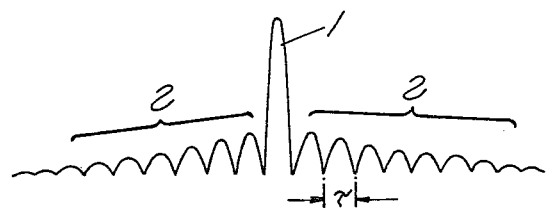
FIG. 1A
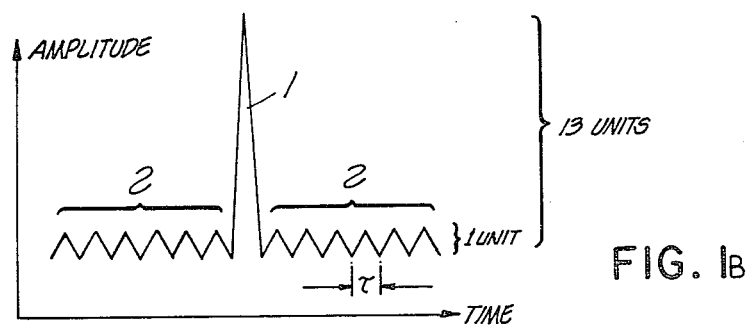
FIG. 1B
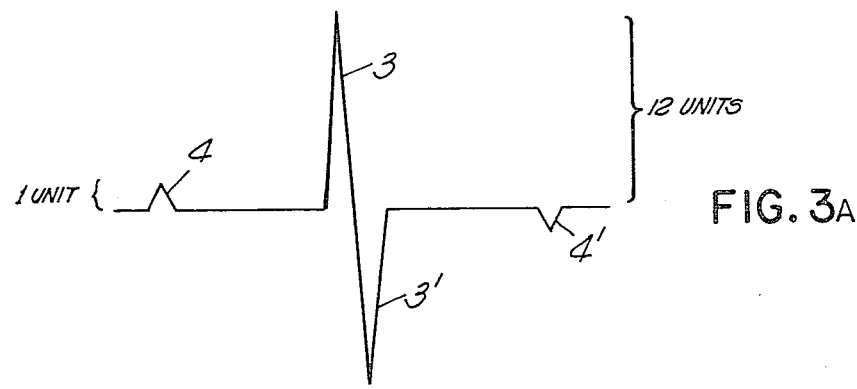
FIG. 3A
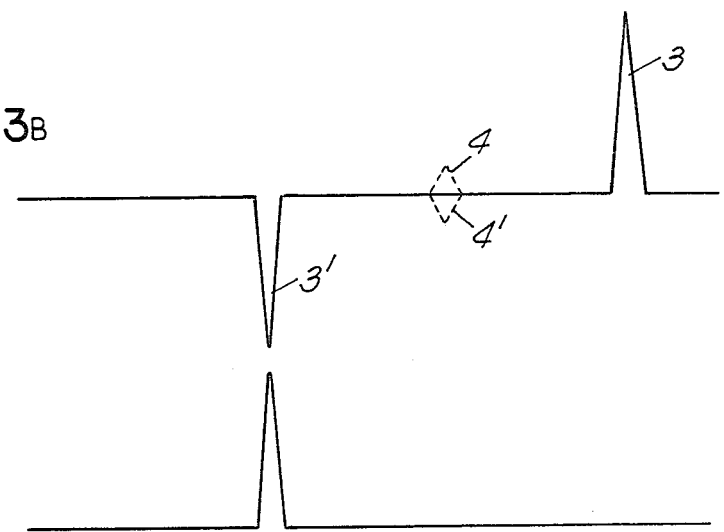
FIG. 3B
FIG. 3C

SIDELOBE REJECTION FILTER

BACKGROUND OF THE INVENTION

This invention is preferably to be used with radar apparatus employing pulse compression techniques, however, the disclosed filter may be advantageously utilized in any signal processing environment wherein an output signal includes a desired spike or pulse of information sandwiched among numerous sidelobes each having the same period. The disclosed filter may be utilized to reduce the magnitude of such sidelobes when such sidelobes normally have no more than slight pulse-to-pulse variations in amplitude.

In radar systems, pulse compression techniques are utilized to put sufficient energy upon a target so that it may be recognized at longer ranges (or so that smaller targets may be recognized) than would otherwise be possible without sacrificing range and Doppler information from analysis of the reflected echo signal. Pulse compression involves the transmission of a long coded pulse and the processing of the received echo to obtain a relatively narrow pulse. Thus, increased detection capability of a long pulse radar is realized while retaining the range resolution of a narrow pulse system. The received echo is processed in the receiver by a matched filter. The matched filter readjusts the relative phases of the frequency components so that a narrow or compressed pulse is again produced. The matched filter results in a correlation of the received signal with the transmitted signal, and thus the output of the matched filter is referred to as the correlation output signal.

As is well known in the pulse compression art, the output of a matched filter typically includes numerous sidelobes in addition to the desired narrow or compressed pulse. Since the sidelobes can be interpreted by a radar system as echoes from that which is, of course, one or more nonexistent targets, it is desirable to select pulse compression schemes which minimize sidelobes and/or use filters to reduce such sidelobes. In the prior art, such sidelobes were reduced by appropriate amplitude weightings to reduce the sidelobes. Examples of such weighting functions are Taylor and Hamming weightings. However, employing such weighting functions is typically both complex and costly, especially in the presence of an expected Doppler frequency shift, where a bank of matched filters is utilized with each filter being matched with different frequencies so as to cover the band of expected Doppler frequencies.

It was, therefore, one object of this invention that the sidelobe response of the auto-correlation output signal be reduced using relatively simple and inexpensive circuit components.

There is yet another object of this invention, that the sidelobe rejection filter be implementable using either analog or digital circuit technology.

The aforegoing objects are achieved as is now described. The auto-correlation output signal, assuming that it has a comparatively narrow pulse and a plurality of sidelobe pulses, each of the pulses having a uniform period $\tau$ and the relative variations in the amplitude of adjacent sidelobe pulses being relatively minor, is first delayed by $\tau$. The output signal is then applied in both $\tau$ delayed and undelayed forms to a difference circuit for determining between $\tau$ delayed and undelayed signals. If the pulse compression technique being used is linear FM, the output of the difference circuit is rectified and the rectified output signal will include the desirable narrow pulse with a relatively small amount of sidelobe information. If the pulse compression technique being used utilizes Barker Codes for phase coding the compressed signal, then further filtering operations may be used, if desired, to further reduce sidelobe response.

In the case of a Barker phase coded signal, the output of the difference circuit is preferably applied to two rectification or polarity determining circuits respectively picking off the positive and negative portions of the output of the difference circuit. One of the outputs of the rectification circuits is thence delayed by $N\tau$ wherein N is the number of bits in the Barker code being utilized. The output of the $N\tau$ delay circuit and the output from the other rectification circuit is thence added and rectified to provide an output signal substantially free of sidelobe responses.

The advantage of the invention, both as to its construction and mode of operation, and the preferred mode of use, will be readily appreciated by those skilled in the art referring to the following detailed description of an illustrative embodiment when considered in conjunction with the accompanying drawings in which like reference numerals refer to the same component throughout the drawings.

BRIEF DESCRIPTION OF THE DRAWINGS

FIGS. 1A and 1B depict waveforms of the type having a central spike of desired information as well as a plurality of time sidelobes.

FIGS. 3A–3C depict the waveform of FIG. 1B as it is being processed at various stages of the filter of FIG. 2.

DETAILED DESCRIPTION OF AN ILLUSTRATIVE EMOBODIMENT

FIG. 1A depicts the waveform having a spike or pulse of desired information, denoted by the numeral 1, as well as a plurality of time sidelobes, denoted by the numeral 2. As can be seen, each of the sidelobes has a period $\tau$ and has an amplitude which changes relatively slowly. The waveform of FIG. 1A, which may be represented either as an analog varying voltage or as a sequence of digital data, may be applied to my filter for reducing the amplitude of the sidelobes.

FIG. 1B shows another waveform which may be processed by my filter to reduce undesirable sidelobes. In FIG. 1B there again appears a spike or pulse of desired data, again denoted by the numeral 1, as well as a plurality of sidelobes 2, the sidelobes each having a uniform period $\tau$. In this case, however, the sidelobes have a uniform amplitude.

It should now be appreciated by those skilled in the art of radar pulse compression techniques that the waveforms of the FIGS. 1A and 1B respectively represent the correlation output signals from a matched filter in a radar system employing linear FM pulse compression and in a radar system employing a Barker code pulse compression. Moreover, with respect to FIG. 1B, those skilled in the art will recognize that Barker code being utilized is the thirteenth order code inasmuch as the central spike or pulse is thirteen units high and there are six sidelobes to each side of the central pulse. In the case of the linear FM pulse compression radar, the corresponding correlation output signal of FIG. 1A has an indeterminate number of sidelobes as opposed to the fixed number of sidelobes as seen with Barker code correlation output signals. For additional information with respect to pulse compression radars and both linear FM and Barker code pulse compression techniques, reference may be made to Chapter 20 of "Radar Handbook" by Merrill Skolnik, published by McGraw-Hill Book Company, 1970, which is hereby incorporated herein by reference.

Figure 2:
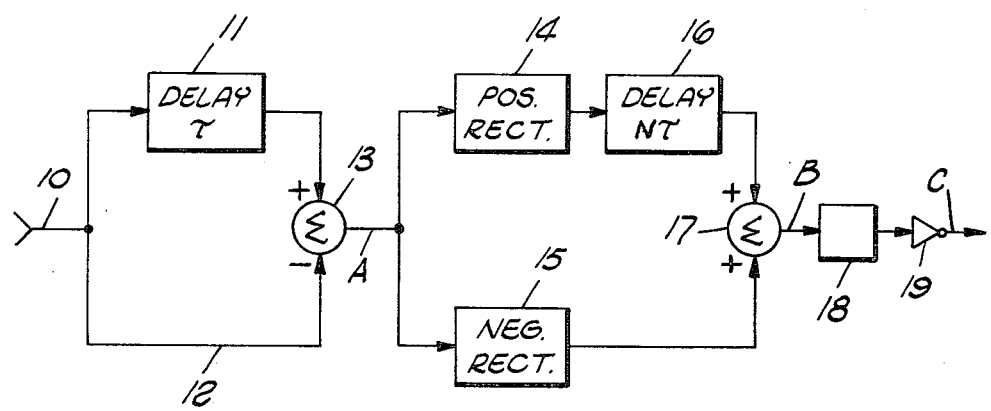
FIG. 2 is a block diagram of my sidelobe rejection filter.

Referring now to FIG. 2, there is shown a block diagram of my filter. The input to the filter occurs at input 10 whereat the waveforms of FIGS. 1A or 1B, or any other waveform generally resembling the waveforms of FIGS. 1A or 1B, is applied thereto. The waveform applied at the input 10 is applied to one input of a difference circuit 13 via lead 12 and is also applied to a delay circuit 11. The amount of delay imposed by the delay circuit 11 is equal to $\tau$, the period of the sidelobes, as aforementioned. The output of delay circuit 11 is applied to the other input of the difference circuit 13 and the difference between the two signals applied to circuit 13 determined and outputted at Reference A.

In FIG. 2, the difference circuit 13 subtracts the signal on lead 12 from the output of delay circuit 11. Thus, assuming the waveform of FIG. 1B were applied at input 10, the waveform at Reference A would correspond to FIG. 3A. As can be seen in FIG. 3A, the result of the subtraction operation performed by circuit 13 has caused the five closest sidelobes on either side of the positive and negative polarity central spikes 3 and 3' to cancel each other. Thus, only the sidelobes occurring at 6$\tau$ (represented by the numerals 4 and 4', respectively) on one side of each central pulse 3 and 3' remain. Of course, as a result of the subtraction operation, the height of the central spike has been reduced from thirteen units to twelve units due to the action of subtracting therefrom a one unit high sidelobe associated with the opposite polarity correlation output signal.

It should be appreciated at this point that if the waveform of FIG. 1A, as opposed to FIG. 1B, were applied to input 10, the signal at Reference A in FIG. 2 would not contain a single positive sidelobe 4 as well as a single negative sidelobe 4' such as is shown in FIG. 3A, but rather would include a plurality of very small height sidelobes extending in a positive direction to the left of central pulse 3 and also extending in a negative direction to the right of central pulse 3'. Of course, the small magnitude sidelobes occur because when the delayed and undelayed forms of the waveform of FIG. 1A are subtracted from each other, the slight differences in the adjacent height of the sidelobes leave small differences as residue sidelobes.

Returning again to FIG. 2, it should be apparent to those skilled in the art that if the positive and negative inputs to the subtraction circuit 13 are reversed that the polarities shown in FIG. 3A are similarly reversed. The particular polarity selected is a matter of design choice.

When the input signal to the filter of FIG. 2 is the waveform of FIG. 1A, then additional processing to eliminate the residue sidelobes is generally not necessary and the output may be simply rectified to capture either the positive going central pulse 3 or the negative going central pulse 3'. However, when the input waveform is the waveform of FIG. 1B, then additional processing should be preferably accomplished to eliminate sidelobes 4 and 4'. In FIG. 2 the positive portion of the waveform of FIG. 3A is captured by a positive rectified 14 and thence delayed by N$\tau$ in a delay circuit 16. N is equal, as has been aforementioned, to the number of bits in the Barker code being utilized. In the case of the example exemplified by FIGS. 3A through 3C wherein a thirteenth order Barker code correlation signal is being processed, the delay in delay circuit 16 is equal to thirteen times $\tau$ units of time.

The negative portion of the waveform of FIG. 3A is captured by negative rectifier 15 and the outputs from delay circuit 16 and negative rectifier 15 are applied to an adder 17 which outputs at Reference B the waveform shown in FIG. 3B.

In FIG. 3B the positive portion of the waveform of FIG. 3A has been delayed by 13$\tau$ with respect to the negative portion so that the two remaining sidelobes 4 and 4' cancel each other when the positive and negative portions are added together.

Turning again to FIG. 2, the output from adder 17 is preferably applied to a rectifier circuit 18 for eliminating either the positive or negative going pulse 3 or 3' shown in FIG. 3B. I preferably capture the negative going pulse inasmuch as in the embodiment illustrated the negative pulse is in correct time relationship with respect to the incoming signal and, therefore, the output of rectifier 18 is preferably applied to an inverter 19 for returning the signal to positive plurality. Thus, inverter 19 outputs a signal at Reference C which is depicted in FIG. 3C.

It should be recognized, moreover, that the positive going signal may be maintained in the correct timing relationship with respect to the input waveform if the positive and negative inputs to subtraction circuit 13 are interchanged and the positive and negative rectifier circuits 14 and 15 are interchanged. Of course, then there is no need to invert the output signal by an inverter such as inverter 19 to obtain the output signal at Refernce C in the same polarity as the input signal.

It will be appreciated by those skilled in the art of digital systems, that in a digital embodiment of FIG. 2, the outputted signal at Reference C may be delayed with respect to the inputted waveform due to delays naturally occurring in digital implementations of difference circuit 13 or adder 17, for example. However, such delays are not uncommon in radar designs and may be compensated for elsewhere in the radar system.

In lieu of inserting a delay out of N$\tau$ into delay circuit 16, the delay inserted may be made equal to N+1/2$\tau$. In this case, in lieu of cancelling sidelobes 4 and 4' against each other they are cancelled against the central pulses 3' and 3, respectively. However, I prefer that delay circuit 16 insert a delay of N$\tau$ since this generally has a smaller affect upon the circuit's signal to noise ratio that inserting a delay of N+1/2$\tau$.

The foregoing discussion with reference to FIG. 2 and 3A–3C has assumed that the Barker code is thirteen bits long. Of course, other length Barker codes are known and may be utilized with my filter if desired. I have described my filter in conjunction with a thirteen bit Barker code because it is the longest known Barker code and long codes are generally preferable in the pulse compression art. Of course, should even longer Barker codes be subsequently discovered, their correlation output signals may also be processed by my filter. My filter is capable of removing or reducing sidelobes occurring in waveforms of the types or classes previously described with reference to FIGS. 1A and 1B without limitation as to the mechanism which generates the waveform to be filtered.

Figure 4:
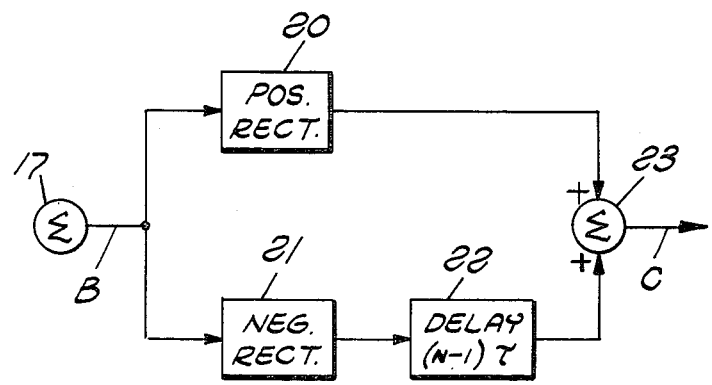
FIG. 4 is a block diagram of a modification which may be made to further improve the filter's signal to noise ratio.

Turning now to FIG. 4, there is shown a circuit which may be used in lieu of the recitifier 18 and inverter 19 (if used) of FIG. 2. In FIG. 4 the output of summer 17 is applied to a positive rectification circuit 20 and to a negative rectification circuit 21 for respectively capturing the positive and negative portions of the signal at Reference B. The negative portion of the signal is delayed in a delay circuit 22 by $(N-1)\tau$ and applied to the negating input of a subtraction circuit 23. The other input to subtraction circuit 23 is the output from positive rectification circuit 20. Outputted from subtraction circuit 23 at Refeerence C is the signal shown in FIG. 3C. The circuit of FIG. 4, in lieu of merely stripping off either the negative or positive going pulse of FIG. 3B, delays the earlier occurring pulse and combines it with the later pulse after they have been placed in phase by delay circuit 22. Of course, the output from the circuit of FIG. 4 differs from the output of the filter of FIG. 2 in that the output in FIG. 4 is delayed by $(N-1)\tau$ with respect to the input waveform, whereas the filter of FIG. 2 does not insert this delay.

My filter may be simply implemented using either standard digital or analog circuit techniques and thus such implementations are not shown in detail herein inasmuch as such designs are well within the skill of circuit designers. My filter is considerably easier to impelement than the traditional weighting filters known in the prior art and is effective in eliminating or reducing undesirable sidelobes from the waveforms previously discussed.

Having described my invention with respect to certain illustrative embodiments, modification may now suggest itself to those skilled in the art. The invention itself is not to be limited to the specific embodiments described, except as set forth in the appended claims.

I claim:

1. A filter for reducing time sidelobes in an input signal, said input signal including a plurality of said sidelobes each having a period $\tau$, said filter comprising:
    delay means coupled to receive said input signal for delaying said output signal by $\tau$;
    a subtraction circuit having two inputs and an output, one of said inputs being responsive to the delayed output of said delay means;
    means coupling the other of said subtraction circuit inputs to said input signal;
    first means responsive to said subtraction circuit output for capturing the positive portion of the signal thereat;
    second means responsive to said subtraction circuit output for capturing the negative portion of said signal thereat;
    second delay means coupled to receive the output of one of said first or second means; and
    adder means coupled to the output of said second delay means and to the output of the other of said first and second capturing means.

2. The filter according to claim 1, wherein said filter is adapted for filtering the autocorrelation output signal generated by a matched filter in response to a Barker Code having N bits and wherein said second delay means imposes a delay equal to $N\tau$.

3. The filter according to claim 1, wherein said filter is adapted for filtering the autocorrelation output signal generated by a matched filter in response to a Barker Code having N bits and wherein said second delay means imposes a delay equal to $N+1/2\tau$.

4. The filter according to claims 1, 2 or 3 wherein said sidelobes in said output signal all have essentially the same amplitude.

5. The filter according to claim 1 wherein the amplitude of said sidelobes vary relatively slowly between adjacent sidelobes.

6. A filter for reducing time sidelobes in an input signal, said input signal including a pulse of desired information as well as a plurality of non-desired sidelobes each of period $\tau$, the amplitudes of said sidelobes being substantially less than the amplitude of said desired pulse, said sidelobe amplitudes varying no more than relatively slightly between adjacent sidelobes, said filter comprising:
    a delay circuit coupled to receive said input signal for delaying said input signal by $\tau$;
    a differencing circuit having two inputs and an output, one of said inputs being responsive to the output of said delay circuit and the other of said difference circuits being responsive to said input signal;
    first means for selecting that portion of the signal outputted from said differencing circuit having substantially only a first polarity;
    second means for selecting that portion of the signal outputted from said differencing circuit having substantially only a second polarity;
    a second delay circuit coupled to the output of said first selecting means for delaying the signal outputted from said first selecting means by a predetermined period of time; and
    an adder circuit having an input coupled to receive the output of said second selecting means and another input coupled to receive the output of said second delay circuit, the output of said adder circuit having time sidelobes suppressed in amplitude as compared to said pulse of desired information.

7. The filter as defined in claim 6, further including means for selecting that portion of the signal outputted from said adder circuit having a predetermined polarity.

8. A method of filtering a signal having a pulse of desired information and a plurality of sidelobes, the amplitude of the sidelobes being substantially less than said pulse and varying no more than relatively slightly between adjacent sidelobes, the period of the sidelobes being $\tau$, the method comprising the steps of:
    delaying said signal by $\tau$;
    taking the difference between said signal and the delayed signal;
    separating the results of said subtracting step into positive and negative polarity signals;
    delaying a selected one of said positive and negative polarity signals by a predetermined amount of time; and
    adding the results of said delaying step and the other of said positive and negative polarity signals to obtain a filtered signal in which said sidelobes are suppressed in amplitude as compared to the amplitude of said pulse of desired information.

9. The method as defined in claim 8, wherein the signal is an autocorrelation signal outputted from a matched filter in response to a Barker Code having N bits and wherein said predetermined amount of time is equal to $N\tau$.

10. The method as defined in claim 9, further including the steps of:

a. separating the results of the adding step into positive and negative component signals;

b. delaying a selected one of the positive and negative component signals by $(N-1)\tau$; and c. adding the component signal delay by $(N-1)\tau$ to the other component signal.

11. The method as defined in claim 9, further including the step of outputting that portion of the results of the adding step having a predetermined polarity.

* * * * *